No. 676,773. Patented June 18, 1901.
J. A. SAMUELS & E. WILLIAMS.
KNIFE CLEANING MACHINE.
(Application filed Oct. 1, 1900.)
(No Model.)
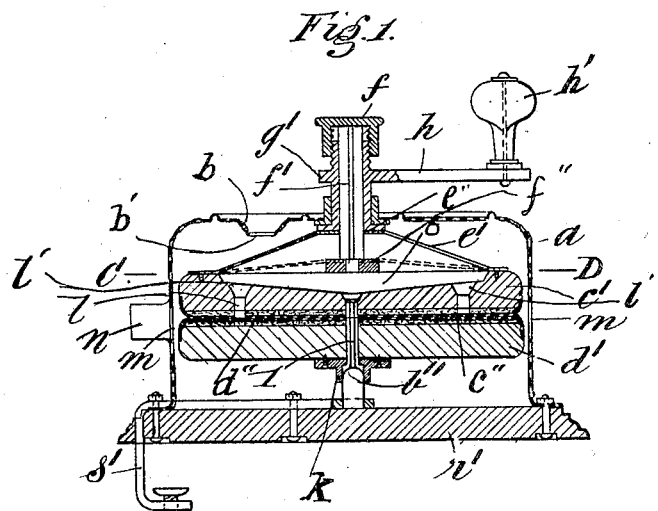
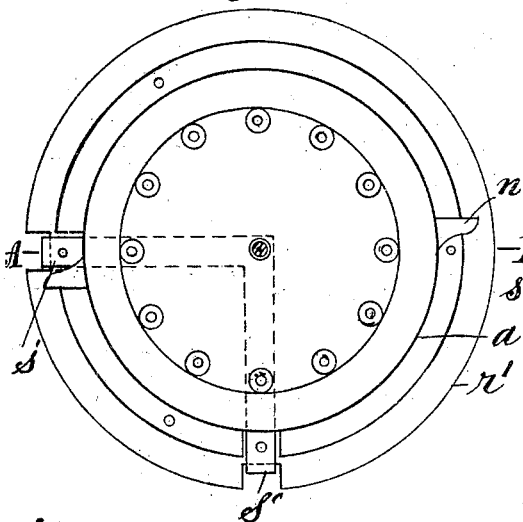 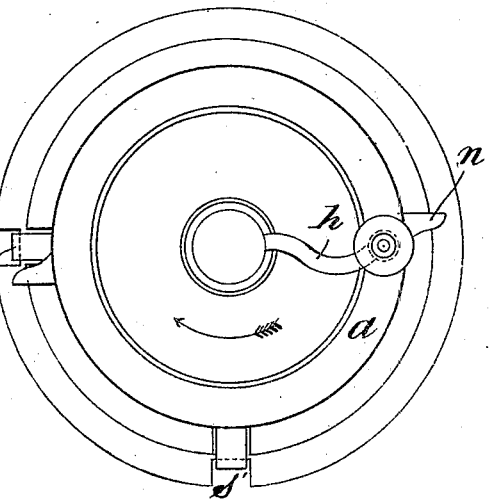
Witnesses.
E. H. Bayly,
George Smith.
Inventors.
John Alexander Samuels,
Edward Williams,
per John Pitt Bayly,
Attorney.
THE NORRIS PETERS CO., PHOTO-LITHO., WASHINGTON, D. C.

UNITED STATES PATENT OFFICE.

JOHN ALEXANDER SAMUELS, OF COUNTY OF SURREY, AND EDWARD WILLIAMS, OF LONDON, ENGLAND.

KNIFE-CLEANING MACHINE.

SPECIFICATION forming part of Letters Patent No. 676,773, dated June 18, 1901.

Application filed October 1, 1900. Serial No. 31,633. (No model.)

*To all whom it may concern:*

Be it known that we, JOHN ALEXANDER SAMUELS, lamp-maker, residing at 2 Hamilton road, Wimbledon, in the county of Surrey, and EDWARD WILLIAMS, gentleman, residing at Sandow Hall, Victoria Embankment, in the county of London, England, subjects of the Queen of Great Britain, have invented new and useful Improvements in Knife-Cleaning Machines, of which the following is a specification.

My invention relates to knife grinding and polishing machines; and the object of the same is to provide a device of this general character which can be clamped to a table or a shelf and serve to polish knives, and kitchen cutlery in particular. With this object in view I have designed the mechanism described in this specification and claimed, and illustrated in the accompanying drawings, forming a part thereof, in which—

Figure 1 is a vertical section of my device, taken on the line A B, Fig. 2. Fig. 2 is a horizontal section on the line C D, Fig. 1. Fig. 3 is a plan view of the device.

Like characters of reference denote like parts in the different views of the drawings.

The character $r'$ designates a base on which my device is mounted, which base has a clamp $s'$ secured thereto, which is employed in clamping the machine to a table or shelf. A casing $a$ for covering and supporting the various parts of grinder is attached to the base $r'$ by bolts passing through a rim on its lower edge. This casing $a$ is apertured at $m$ to permit the insertion of knife-blades, and rests $n$ project from the casing $a$, adjacent to the apertures $m$. A conical recess $b$ is formed in the top of the casing $a$ and connects with an aperture $b'$. This aperture $b'$ and recess $b$ enable grinding-powder to be introduced into the casing.

The grinding mechanism for the knives is covered and supported by the casing $a$ and comprises two grinding-disks $d'$ $c'$, mounted horizontally, with their faces superimposed on one another and in contact. The contacting faces of the disks $c'$ $d'$ are covered with skin or leather $d''$, backed by felt $c''$ or other suitable material. The lower disk $d'$ is provided with a bearing $k$, which rests on a rounded pin $b'$, seated in the base $r'$ and having a spindle 1 formed integral therewith, which spindle extends up and through apertures 2 and 3, traversing centrally the disks $d'$ and $c'$, respectively. The spindle 1 loosely fits the apertures 2 and 3 and serves as an axle about which the disks revolve. The upper face of the disk $c'$ has formed therein a large disk-shaped recess $o$, which forms a receptacle for the grinding-powder and communicates with the grinding-faces of the disks $c'$ and $d'$ by means of passages $l$, having conical mouths $l'$.

The casing $a$ is centrally apertured at 4 to accommodate the driving mechanism, which comprises a sleeve $g'$, having a crank-arm $h$ formed integral therewith, which sleeve is slidingly mounted on a square shank $f'$. The sleeve $g'$ passes through a boss $g''$, mounted in the aperture 4, and a flange 5, formed on the lower end of the sleeve, engages the boss $g''$ and limits the upward movement of the sleeve. The shank $f'$ passes down through a square aperture $e''$, formed in a bridge $e'$, spanning the recess $o$ and firmly secured at each end to the disk $c'$. This construction constrains the disk $c'$, bridge $e'$, shaft $f'$, sleeve $g'$, and crank-arm $h$ to turn in unison. The lower disk $d'$ is driven by the friction between it and the disk $c'$. The lower end of the shank $f'$ is rigidly secured to bars $f'''$, which extend across and bear on the face of the disk $c'$. An interiorly-threaded cap $f$ is screwed on the upper end of the sleeve $g'$ and bears on the projecting end of the shaft $f'$. By this arrangement of sliding shank-bars $f'''$ and cap $f$ the pressure of the disks $c'$ $d'$ can be easily regulated by turning the cap $f$.

In operation the knife to be ground or polished is inserted in one of the apertures $m$ and between the disks $c'$ $d'$, with the handle resting against one of the guards $n$. Grinding-powder, such as flour of emery, is poured through the aperture $b'$ and into the recess $o$. The knob $h'$ is then grasped and turned. The powder will trickle through the apertures $l$ and run down between the faces of the disks. The pressure of the disks is regulated by turning the cap $f$.

We do not wish to be limited as to details of construction, as these may be modified in many particulars without departing from the spirit of our invention.

Having thus described our invention, what we claim as new, and wish to secure by Letters Patent, is—

1. In a device of the class described, the combination, of a lower disk mounted to turn, an upper disk having a dished recess therein, and apertures extending transversely said disk and communicating with said recess, a bridge secured to said upper disk, a squared shank passing through a square aperture in said bridge, a sleeve slidingly mounted on said shank and means for turning said sleeve, substantially as described.

2. In a device of the class described, the combination with a base, of a casing mounted thereon, a lower disk centrally apertured and provided with a bearing, a pin seated in said base and having a spindle thereon, said pin being located to fit the bearing on said lower disk, an upper disk centrally apertured and mounted to revolve on said spindle, a bridge having a square aperture therein and rigidly attached to said upper disk, a squared shank fitting the aperture in said bridge, an exteriorly-threaded sleeve mounted on said squared shank and having a flange thereon which engages said casing and holds the sleeve against upward displacement, a cap fitting the threads on said sleeve and bearing in the upper end of said shank, and means for turning said sleeve to operate said disk, substantially as described.

3. In a device of the class described, the combination with a base, of a casing mounted on said base, a lower grinding-disk centrally apertured and provided with a bearing, a pin seated in said base and having a spindle thereon, said pin being located to fit the bearing on said lower disk, an upper disk centrally apertured and mounted to turn on said spindle, and means for turning said upper disk.

In testimony whereof we have signed our names to this specification in the presence of two subscribing witnesses.

JOHN ALEXANDER SAMUELS.
EDWARD WILLIAMS.

Witnesses:
WILLIAM PETO WALKER,
ERNEST H. ALTMAN.